(12) United States Patent
Pratt

(10) Patent No.: US 9,440,772 B2
(45) Date of Patent: Sep. 13, 2016

(54) SUPPORT UNIT

(71) Applicant: William K. Pratt, Bedford, PA (US)

(72) Inventor: William K. Pratt, Bedford, PA (US)

(73) Assignee: COMPANY BLACK LLC, Bedford, PA (US)

( * ) Notice: Subject to any disclaimer, the term of this patent is extended or adjusted under 35 U.S.C. 154(b) by 0 days.

(21) Appl. No.: 14/613,472

(22) Filed: Feb. 4, 2015

(65) Prior Publication Data

US 2016/0221715 A1  Aug. 4, 2016

(51) Int. Cl.
*B65D 19/00* (2006.01)
*B65D 19/20* (2006.01)
*B65D 19/44* (2006.01)

(52) U.S. Cl.
CPC ............. *B65D 19/20* (2013.01); *B65D 19/44* (2013.01); *B65D 2519/0086* (2013.01); *B65D 2519/00562* (2013.01); *B65D 2519/00815* (2013.01)

(58) Field of Classification Search
CPC .......... B65D 2519/00019; B65D 2519/00054; B65D 2519/00124; B65D 2519/00562; B65D 2519/00333; B65D 19/44
USPC ............. 108/51.3, 51.11, 55.3, 55.1
See application file for complete search history.

(56) References Cited

U.S. PATENT DOCUMENTS

| | | | |
|---|---|---|---|
| 1,201,981 A | 10/1916 | Pitcher | |
| 2,506,346 A | 5/1950 | Crawford | |
| 2,716,532 A | 8/1950 | Wysong, Jr. et al. | |
| 2,589,651 A | 3/1952 | Ballard | |
| 2,626,456 A | 1/1953 | Harrison | |
| 2,774,490 A | * 12/1956 | Strong | B65D 19/36 108/51.3 |
| 2,803,363 A | 8/1957 | Hutchinson | |
| 2,997,266 A | 8/1959 | Munroe | |
| 2,913,206 A | 11/1959 | Paris | |
| 3,167,038 A | 1/1965 | Brown | |
| 3,288,311 A | 6/1966 | Beattie | |
| 3,302,593 A | * 2/1967 | Roberts | B65D 19/0069 108/51.3 |
| 3,472,363 A | * 10/1969 | Overton | B65D 19/44 108/55.1 |
| 3,520,258 A | * 7/1970 | Shepherd | B65D 19/0012 108/51.3 |
| 3,587,479 A | * 6/1971 | Geschwender | B31D 3/0284 108/51.3 |
| 3,589,309 A | 6/1971 | Clark, Jr. | |
| 3,753,407 A | * 8/1973 | Tilseth | B65D 19/44 108/53.3 |
| 3,838,632 A | 10/1974 | Miyake | |
| 3,907,241 A | 9/1975 | Oglesby et al. | |
| 4,093,760 A | 6/1978 | O'Malley | |
| 4,170,451 A | 10/1979 | Luff | |
| 4,195,732 A | 4/1980 | Bell | |
| 4,220,099 A | 9/1980 | Marchesano | |
| 4,241,810 A | * 12/1980 | Newlon | B65D 81/113 188/376 |
| 4,253,826 A | 3/1981 | Campbell, Jr. | |
| 4,305,508 A | * 12/1981 | Rodgers | B65D 19/0095 108/55.3 |

(Continued)

*Primary Examiner* — Jose V Chen
(74) *Attorney, Agent, or Firm* — Vorys, Sater, Seymour and Pease LLP

(57) ABSTRACT

A lightweight manually transportable unit, effective in supporting a heavyweight tubular member including a spaced pair of beams each formed of a set of plies of corrugated cardboard and having a recess with a curved cross-sectional configuration, aligned with the recess of the other of such beams, and an enclosure formed of planar and curved panel formed of corrugated cardboard encompassing such spaced beams, wherein the plies of such beams and the enclosure encompassing such beams are secured together by a biodegradable adhesive.

14 Claims, 2 Drawing Sheets

(56) References Cited

U.S. PATENT DOCUMENTS

| | | | |
|---|---|---|---|
| 4,382,733 A * | 5/1983 | Rodgers | B65D 19/0095 108/55.3 |
| 4,405,673 A | 9/1983 | Fridley et al. | |
| 4,428,893 A | 1/1984 | Cummings, Jr. et al. | |
| 4,501,402 A | 2/1985 | Saito et al. | |
| 4,747,775 A | 5/1988 | Takagi et al. | |
| 4,898,102 A * | 2/1990 | Thebeau | B65D 19/0095 108/55.3 |
| 5,092,367 A | 3/1992 | Gilleland | |
| 5,184,558 A | 2/1993 | Wozniacki | |
| 5,191,740 A | 3/1993 | Rose | |
| 5,207,631 A | 5/1993 | Schmidtke et al. | |
| 5,218,913 A | 6/1993 | Winebarger et al. | |
| 5,230,291 A * | 7/1993 | Juvik-Woods | B65D 19/0012 108/51.3 |
| 5,357,875 A | 10/1994 | Winebarger et al. | |
| 5,386,786 A * | 2/1995 | Kilpatrick | B65D 19/0002 108/51.3 |
| 5,425,314 A | 6/1995 | MacFarland | |
| 5,427,019 A | 6/1995 | Moorman | |
| 5,461,988 A * | 10/1995 | Cummings | B65D 19/0075 108/51.3 |
| 5,465,672 A * | 11/1995 | Boyse | B65D 19/0012 108/51.3 |
| 5,487,345 A | 1/1996 | Winebarger et al. | |
| 5,490,465 A | 2/1996 | Hoyt et al. | |
| 5,515,977 A * | 5/1996 | Lambert | B65D 85/66 206/395 |
| 5,531,166 A * | 7/1996 | Woods | B65D 71/0092 108/51.3 |
| 5,537,937 A * | 7/1996 | Juvik-Woods | B65D 19/0012 108/51.3 |
| 5,568,774 A | 10/1996 | Hutchison | |
| 5,685,233 A | 11/1997 | DeJean | |
| 5,685,234 A * | 11/1997 | Grigsby | B31B 7/00 108/51.3 |
| 5,799,584 A | 9/1998 | Campbell | |
| 5,941,177 A * | 8/1999 | Anderson | B65D 19/0095 108/51.3 |
| 5,996,509 A * | 12/1999 | Lai | B65D 19/0012 108/51.3 |
| 6,076,475 A * | 6/2000 | Kuhn | B65D 19/0012 108/51.3 |
| 6,135,030 A * | 10/2000 | Besaw | B65D 19/0012 108/51.3 |
| 6,155,181 A | 12/2000 | Chilcutt | |
| 6,550,741 B1 | 4/2003 | Cottone | |
| 6,672,029 B2 | 1/2004 | Tucker | |
| 7,503,727 B2 | 3/2009 | Ingebretsen et al. | |
| 7,959,059 B2 * | 6/2011 | Tamamori | B65D 19/44 108/54.1 |
| 8,113,129 B1 | 2/2012 | Hurley et al. | |
| 8,127,929 B1 | 3/2012 | Lu et al. | |
| 8,469,085 B2 | 6/2013 | Orgeron | |
| 8,544,814 B2 | 10/2013 | Diaz | |
| 9,174,768 B2 | 11/2015 | Love | |
| 2002/189507 A1 | 12/2002 | Benner | |
| 2007/0237612 A1 | 10/2007 | Mammome et al. | |
| 2007/0256614 A1 * | 11/2007 | Chen | B65D 19/0069 108/153.1 |
| 2010/0078429 A1 * | 4/2010 | Strang | B65D 90/004 220/1.5 |
| 2012/0204767 A1 | 8/2012 | Jian et al. | |
| 2012/0260832 A1 | 10/2012 | Linares | |
| 2013/0115010 A1 | 5/2013 | Connors et al. | |
| 2013/0216339 A1 | 8/2013 | Apps et al. | |
| 2013/0343834 A1 | 12/2013 | Flusche | |
| 2016/0130032 A1 | 5/2016 | Pratt | |

* cited by examiner

SUPPORT UNIT

This invention relates to a support unit and more particularly to a unit functional in supporting a heavyweight tubular member, which is lightweight and manually transportable.

BACKGROUND OF THE INVENTION

In the oil and gas producing industries, it typically is required to transport product from a production site to an end use or refinement site. In providing for such transmission, typically, a right-of-way is acquired between sites, a trench is formed along such right-of-way, pipeline segments are positioned in end-to-end relation along such trench and welded together, and then the trench is filled to cover a completed pipeline. In positioning such pipeline segments in a trench and welding them together, various support structures are used to facilitate the welding operation. Typically, wooden beams are used which often are stored at facilities distant from intended pipeline routes, transported through the use of vehicle from such facilities to drop-off locations along a pipeline trench, transported to spaced locations along such trench and then lowered into the trench for positioning an end portion of a pipeline segment to be welded to an aligned segment. Although various mechanical machines and devices are used to haul such beams, they often are transported manually which often is burdensome in view of their considerable weight. Upon completion of each welding routine, such wooden beams are required to be removed from their support sites and moved to sequential support sites, which is done manually. Upon completion of a pipeline burial operation, such support beams, to the extent they continue to be serviceable, are returned to a distant storage site for future usage, requiring additional mechanical and manual handling.

In view of the foregoing, it is the principal object of the present invention to provide a means which is sufficiently sturdy to support a portion of a heavy pipeline segment, lightweight to facilitate mechanical and manual transporting from a remote storage site to a pipeline trench site and of a construction conducive to suitable disposal following such use.

SUMMARY OF THE INVENTION

The principal object of the present invention is achieved by means of a lightweight, manually transportable unit, effectual in supporting a heavyweight tubular member, providing a pair of spaced beams each formed of a set of plies of corrugated cardboard and having a recess with a curved cross-sectional configuration, aligned with the recess of the other of such beams, and an enclosure formed of planar and curved panels formed of corrugated cardboard encompassing such pair of spaced beams, wherein the plies of such beams are secured together and the enclosure encompassing the pair of spaced beams is secured to said beams by a biodegradable adhesive. In a preferred embodiment of invention, the enclosure is provided with a biodegradable coating, and one or two additional beams interconnecting the two spaced beams is provided to enhance the rigidly of the unit.

DETAILED DESCRIPTION OF THE PREFERRED EMBODIMENT OF THE INVENTION

Figure 1:
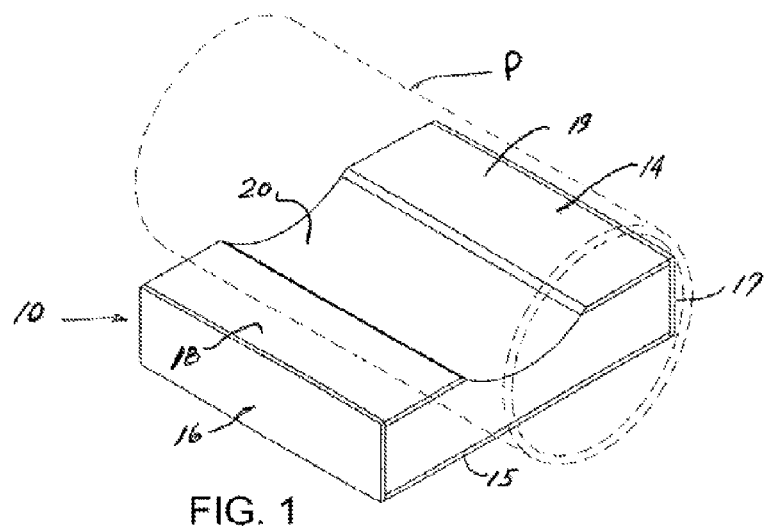
FIG. 1 is a perspective view of an embodiment of the invention functional in supporting a heavy pipeline segment as illustrated in broken lines.
Figure 2:
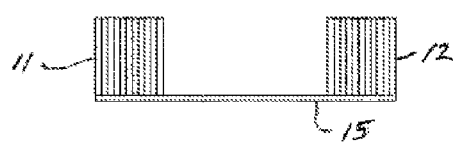
FIG. 2 is an end view of the unit shown in FIG. 1 having the enclosure portion removed.
Figure 3:
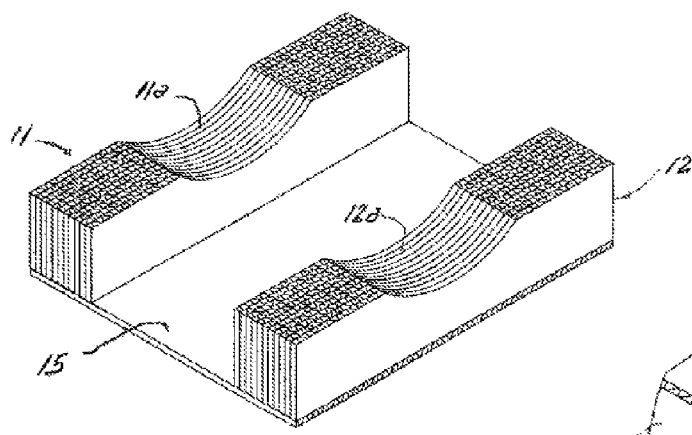
FIG. 3 is a perspective view of the segment shown in FIG. 2.
Figure 4:
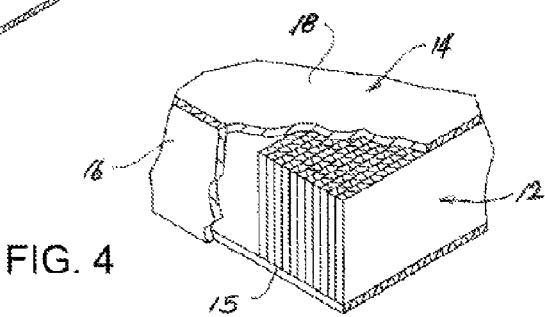
FIG. 4 in an enlarged, fractional view of a corner portion of the unit shown in FIG. 1, having portions of the end and top panels of the enclosure portion removed to reveal an end portion of one of the beam members constituting a component thereof.
Figure 5:
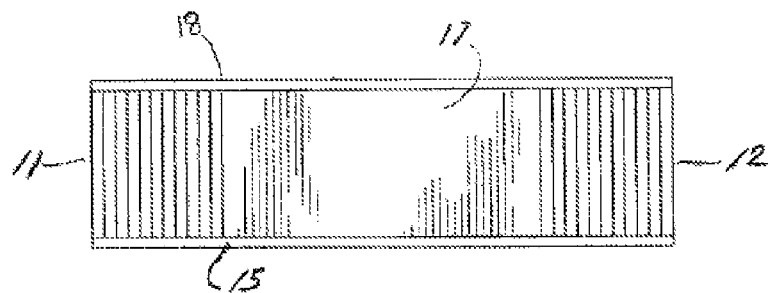
FIG. 5 is a view similar to the view shown in FIG. 2, further provided with top and bottom panels and an end panel of the enclosure portion of the unit.

Referring to FIGS. 1 through 5 of the drawings, there is illustrated a unit 10 embodying the present invention, functional to support a heavy pipeline section P, generally including a pair of substantially similar beams 11 and 12 and an enclosure 14 encompassing such beams. As shown in FIG. 3, such beams are identical in size and construction, each having an elongated, rectangular configuration with a recesses on an elongated upper surface thereof, and being comprised of a set of plies adhesively secured together along the lengths thereof. Enclosure 14 includes a bottom, rectangularly configured planar panel 15, a set of end, rectangularly configured panels 16 and 17, a set upper, rectangularly configured planar panels 18 and 19 are an upper panel 20 having a curved cross-sectional configuration. Each of such panels is formed of corrugated cardboard.

Each of beams 11 and 12 is formed the longer length of enclosure panel 15, and is provided with a recess 11a or 12a, each of which is disposed at the center of its respective beam and is provided with a curved, cross-sectional configuration similar to the cross-sectional configuration of enclosure panel 20. Each of enclosure panels 16 through 19 is formed the shorter length of enclosure panel 15, and curved panel 20 similarly is formed such shorter length.

In forming support article 10, the plies of each of the beam members are first formed and then advesively secured together along the lengths thereof to form the beam member, and the several planar and the curved panels of the enclosure are formed and cut to required size. The article is then completed by positioning and adhesively adhering beams 11 and 12 in spaced relation along the longer sides of enclosure panel 15, with recesses 11a and 12a thereof transversely aligned. End panels 16 and 17 are then adhesively adhered to the edges of panel 15 and the ends of beams 11 and 12, curved recess panel 20 is positioned on and adhesively adhered to the recessed surfaces 11a and 12a of the beams and panel members 18 and 19 are positioned on and adhesively adhered to the upper end surfaces of the beams to fully enclose the beams with the exception of the outer sides thereof and provide a finished support unit functional to receive and support a pipeline segment P on the surface of enclosure panel 20.

In the assembly of unit 10 as described, biodegradable adhesives are used to secure the plies of the beam members together, and to further secure the enclosure panels to the beam members. In addition, upon completion of the assembly process, the enclosure is coated with a biodegradable material. The biodegradable adhesive may consist Dexatrin, starch based glues, Casein glues and Mucilage. The biodegradeable coating may consist of natural rubber, latex, india rubber, polyisoprene, polymers of isoprene, polyisoprene elastomers, polymer Cis-1, 4-polyisoprene, 2-octylcyanoacrylate, cyanoacrylate esters and vinyl identified by CAS numbers by the Chemical Abstracts Service, a division of the American Chemical Society.

Figure 6:
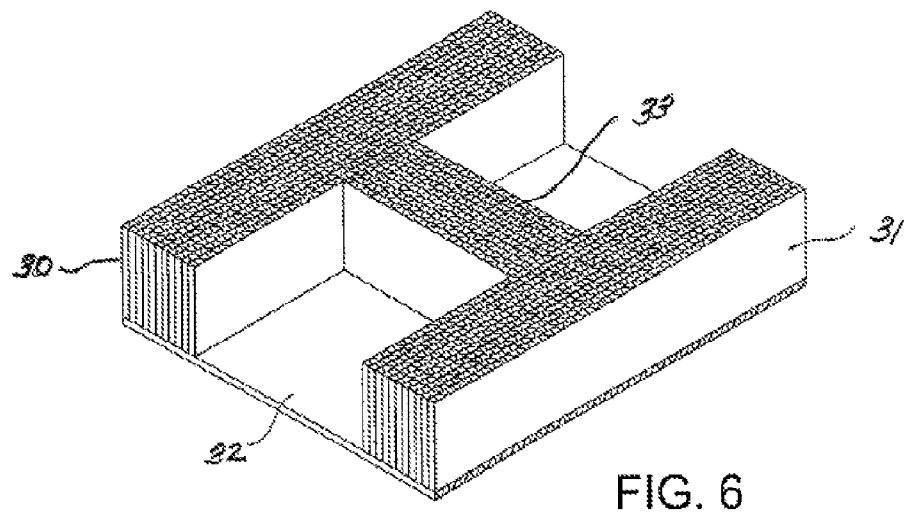
FIG. 6 is a partial, perspective view of another embodiment of the invention, having top and end panels of the enclosure removed, and prior to the formation of one or more recesses in the beam segments thereof for partially providing a seating surface for a tubular member.

FIG. 6 illustrates a substructure comparable but variant of the substructure of unit 10 shown in FIG. 3. In such embodiment, beams 30 and 31 comparable to beams 11 and 12 are disposed in spaced, parallel relation, adhesively secured to enclosure panel 32 comparable to panel 15, and is provided with an interconnecting beam 33 similarly formed of a set of plies adhesively secured together and adhesively secured to bottom panel 32. Although not shown for purposed of clarity, the beam members collectively or singularly may be provided with a recess provided with a curved cross-sectional configuration similar to either of recesses 11a and 11b, disposed either along the length of interconnecting beam 33 and the center portions of beams 30 and 31, or disposed through beam 33 and parallel to beams 30 an 31. Such base structure further would be provided with additional enclosure panels to fully enclose the assembly shown in FIG. 1.

Figure 7:
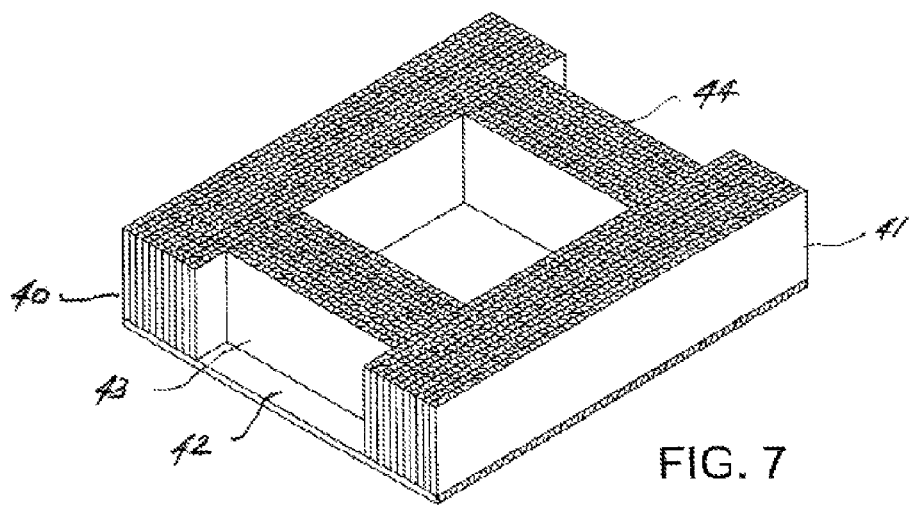
FIG. 7 is a view similar to the view shown in FIG. 6 provided with a pair of spaced, interconnecting beams, also prior to the formation of one or more recesses in the beam segments thereof for partially providing a seating surface for tubular member.

FIG. 7 illustrates an additional substructure also comparable but variant to the substructure of unit 10 shown in FIG. 3. Such further embodiment is similar to the embodiment shown in FIG. 6 including a pair of spaced, parallel beams 40 and 41 adhesively connected to enclosure panel 40 and a pair of spaced, parallel beams 43 and 44 interconnecting beams 40 and 41. As provided in the previously described embodiment, a set of spaced, aligned recesses, each provided with a curved cross-section configuration and formed either at the mid points of beam set 40 and 41 or beam set 43 and 44, and such base structure is provided with additional enclosure panels to fully enclose the assembly shown in FIG. 1.

Any embodiment of the invention as described may readily, effortlessly and rapidly be stored at a facility distant from a pipeline route, manually loaded onto transporting vehicles, transported to selected sites along such pipeline route, manually unloaded and stacked and then manually transported to selected sites along such route and positioned to support an end portion of a pipeline segment to be welded to an abutting pipeline segment. Upon completion of the welding operation, the unit may either be manually transported to another site along the pipeline route and used again to support a pipeline segment to be joined to an adjacent segment, transported back to its storage facility if usable or simply discarded within the pipeline trench to be buried with the pipeline and allowed to degrade.

The units as described have many benefits and are a substantial improvement over currently used pipeline support devices. They are formed of comparatively inexpensively materials, easily fabricated, comparatively lightweight permitting them to be manually transported and handled and biodegradable allowing them to be discarded on site avoiding rehandlingy and any harmful environmental effect.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A lightweight, manually transportable unit disposable on the bed of a trench, effectual in supporting a heavyweight tubular member comprising:
   a pair of spaced beams each formed of a set of plies of corrugated cardboard and having a recess with a curved cross-sectional configuration, aligned with the recess of the other said beams; and
   a single enclosure formed of planar and curved panels formed of corrugated cardboard encompassing said pair of spaced beams for completely enclosing the pair of spaced beams,
   wherein said plies of said beams are secured together and said enclosure encompassing said pair of spaced beams are secured together by a biodegradable adhesive,
   wherein the enclosure comprises a planar bottom wall, opposed first and second planar side walls, opposed front and rear planar walls, and a top wall secured together by the biodegradable adhesive,
   the planar bottom wall attached to bottom surfaces of the pair of beams,
   the opposed first and second planar side walls attached to outer side surfaces of the pair of beams,
   the opposed front and rear planar walls attached to respective front and rear ends of the beams, and
   the top wall comprising a central curved panel having two ends each resting on and attached to a respective said recess and flanking planar panels each resting on and attached to an upper surface of a respective said beam.

2. The unit of claim 1 wherein said enclosure is coated with a biodegradable material.

3. The unit of claim 1 wherein said enclosure is provided with a substantially rectangular configuration.

4. The unit of claim 1 wherein said biodegradable adhesive comprises one of a group consisting of Dexatrin, starch based glues, Casein glues and Mucilage.

5. The unit of claim 1, wherein said biodegradable coating comprises one of a group consisting of natural rubber, latex, india rubber, polyisoprene, polymers of isoprene, polyisoprene elastomers, polymer cis-1, 4-polyisoprene, 2-octylcyanoacrylate, cyanoacrylate esters and vinyl identified by CAS numbers by the Chemical Abstracts Service, a division of the American Chemical Society.

6. A lightweight, manually transportable unit disposable on the bed of a trench, effectual in supporting a heavy weight tubular member, comprising:
   a pair of spaced beams each formed of a set of plies of corrugated cardboard;
   a beam formed of a set of plies of corrugated cardboard interconnecting said spaced beams; and
   a single enclosure formed of segments of corrugated cardboard encompassing said beams for completely enclosing the pair of spaced beams,
   wherein the enclosure comprises a planar bottom wall, opposed first and second planar side walls, opposed front and rear planar walls, and a top wall secured together by the biodegradable adhesive, wherein said plies of said beams are secured together and said enclosure encompassing said pair of spaced beams are secured together by a biodegradable adhesive, wherein the enclosure comprises a planar bottom wall, opposed first and second planar side walls, opposed front and rear planar walls, and a top wall secured together by the biodegradable adhesive, the planar bottom wall attached to bottom surfaces of the pair of beams, the opposed first and second planar side walls attached to outer side surfaces of the pair of beams, the opposed front and rear planar walls attached to respective front and rear ends of the beams, and the top wall comprising a central curved panel having two ends each resting on and attached to a respective said recess and flanking planar panels each resting on and attached to an upper surface of a respective said beam, wherein one of said spaced and interconnecting beams together, and said interconnecting beam alone, having an elongated recess provided with a curved cross-sectional configuration, and said enclosure includes a curved panel overlying said recess.

7. The unit of claim 6 wherein said enclosure is coated with a biodegradable material.

8. The unit of claim 6 wherein said enclosure is provided with a substantially rectangular configuration.

9. The unit of claim 6 wherein said plies of corrugated cardboard of each of said beams are secured together by means of a biodegradable adhesive and said enclosure is secured to said beams by means of a biodegradable adhesive.

10. A lightweight, manually transportable unit, effectual in supporting a heavyweight tubular member, comprising;

a first pair of spaced beams each formed of a set of plies of corrugated cardboard;

a second pair of spaced beams each formed of a set of plies of corrugated cardboard interconnecting said first pair of spaced beams;

and a single enclosure formed of segments of corrugated cardboard encompassing said beams for completely enclosing the pair of spaced beams, wherein one of said first and second sets of beams having aligned recess provided with curved cross-sectional configurations, and said enclosure includes curved panels overlying said recesses wherein said plies of said beams are secured together and said enclosure encompassing said pair of spaced beams are secured together by a biodegradable adhesive, wherein the enclosure comprises a planar bottom wall, opposed first and second planar side walls, opposed front and rear planar walls, and a top wall secured together by the biodegradable adhesive, the planar bottom wall attached to bottom surfaces of the pair of beams, the opposed first and second planar side walls attached to outer side surfaces of the pair of beams, the opposed front and rear planar walls attached to respective front and rear ends of the beams, and the top wall comprising a central curved panel having two ends each resting on and attached to a respective said recess and flanking planar panels each resting on and attached to an upper surface of a respective said beam.

11. The unit of claim 10 wherein said enclosure is coated with a biodegradable material.

12. The unit of claim 10 wherein said enclosure is provided with a substantially rectangular configuration.

13. The unit of claim 10 wherein said plies of corrugated cardboard of said beams are secured together by means of a biodegradable adhesive and said enclosure is secured to said beams by means of a biodegradable adhesive.

14. The unit of claim 13 wherein said enclosure is coated with a biodegradable material.

\* \* \* \* \*